United States Patent [19]
Hamasaki et al.

[11] Patent Number: 6,054,049
[45] Date of Patent: Apr. 25, 2000

[54] MAGNETIC FLUID MODIFICATION DEVICE AND USE

[76] Inventors: Kazunori Hamasaki, 1160 Sesegushi, Kiire Town, Ibusuki County, Kagoshima Pref; Kenji Ohwari, 2377-2 Usukicho, Kagoshima City, Kagoshima Pref; Matsuji Mori, 7937-21 Masuyama, Kaseda City, Kagoshima Pref, all of Japan

[21] Appl. No.: 09/110,075

[22] Filed: Jul. 2, 1998

[51] Int. Cl.$^7$ ................................. B01F 3/04; B01J 19/12
[52] U.S. Cl. ..................... 210/222; 261/153; 261/154; 261/119.1; 261/119.2
[58] Field of Search ............................ 210/222; 261/153, 261/154, 119.1, 119.2

[56] References Cited

U.S. PATENT DOCUMENTS

| | | |
|---|---|---|
| 3,074,390 | 1/1963 | O'Laughlin . |
| 3,228,868 | 1/1966 | Ruskin . |
| 4,031,171 | 6/1977 | Asao et al. . |
| 4,183,339 | 1/1980 | Nagaishi et al. . |
| 4,248,707 | 2/1981 | Granger ................................. 210/695 |
| 4,414,951 | 11/1983 | Saneto . |
| 4,461,262 | 7/1984 | Chow . |
| 5,487,370 | 1/1996 | Miyazaki . |
| 5,589,065 | 12/1996 | Bogatin et al. . |
| 5,804,067 | 9/1998 | McDonald et al. ...................... 210/222 |
| 5,837,143 | 9/1998 | Mercier ................................... 210/695 |

*Primary Examiner*—Jill Warden
*Attorney, Agent, or Firm*—Clyde I. Coughenour

[57] ABSTRACT

To improve the affinity between a gas and a liquid, the liquid is passed through an enclosure where it contacts a portion of the magnets of a magnetic field generating device and passes through the magnetic field created by the magnets while a gas is in contact with the other portion of the magnets. A liquid level control device maintains and controls the liquid level so that the magnets simultaneously extend about equally into the gas and liquid with both contacting the magnets and being within the magnetic field created by the magnets. The gas in the enclosure increases the effectiveness that the magnetic field and magnets have on the liquid. The gas used in the enclosure can optionally subsequently be mixed with the liquid or another gas can be mixed with the liquid. Additional gases and liquids can be mixed together. The device and process associated with it can be used on different liquids and different gasses, including fuel mixed with air in a combustion process.

20 Claims, 1 Drawing Sheet

MAGNETIC FLUID MODIFICATION DEVICE AND USE

This application relates to a Japanese patent application, 7-350490 filed Dec. 22, 1995 that was published Jul. 8, 1997 as 9-176660.

BACKGROUND OF THE INVENTION

1. Field of the Invention

A liquid to be mixed together with a gas uses the magnets and magnetic field created by the permanent magnets of a magnetic field generator arranged between and in contact with both the gas and liquid within an enclosure to modify the liquid so as to create an affinity between it and a gas.

2. Description of Related Art

It is well known in the art that a liquid and a gas can be mixed together and that an electrical and/or magnetic field can be applied to assist mixing. The best known use of this concept is mixing air and fuel for burning, especially burning in an internal combustion engine. The magnetic forces produce various physical changes in the liquid and gas that assists in a more rapid and complete mix and a more complete combustion.

The prior art shows various arrangements for elongated magnetic devices used in liquid fuel lines; Saneto, U.S. Pat. No. 4,414,951, issued Nov. 15, 1983; and Miyazaki, U.S. Pat. No. 5,487,370, issued Jan. 30, 1996; and Bogatin et al, U.S. Pat. No. 5,589,065, issued Dec. 31, 1996, are representative of magnet means installed within fuel and other lines for treatment of the liquid passing therethrough. Chow, U.S. Pat. No. 4,461,262, issued Jul. 24, 1984, teaches magnets used for both the air and fuel in an internal combustion engine.

It is also known that magnets or an electric charge means can be placed in an enclosure where there is air above a liquid; O'Laughlin, U.S. Pat. No. 3,074,390 issued Jan. 22, 1963; and Ascio et al, U.S. Pat. No. 4,031,171, issued Jun. 21, 1977; and Nagaishi et al, U.S. Pat. No. 4,183,339, issued Jan. 15, 1980; and Granger, U.S. Pat. No. 4,248,707, issued Feb. 3, 1981 are representative of magnet and electrically charged means within a liquid having a gas-liquid interface.

SUMMARY OF THE INVENTION

The invention is directed to providing an affinity between a liquid and a gas to assist dispersal and vaporization of the liquid in the gas. The affinity and/or miscibility between the liquid and gas is enhanced or modified by passing the liquid through an enclosure that has magnets that are positioned so as to have one portion of the magnets extend into a gas while another portion of the magnets extends into the liquid. If the liquid is a fuel and the gas is air that is to be mixed, the fuel is broken up into finer particles or molecules, and with the better affinity or attraction between them, the fuel and air are better mixed together. The improvement in the mix yields an improvement in combustion efficiency which in turn reduces the rate of fuel consumption, exhaust smoke, carbon monoxide, hydrocarbons, residue, etc., due to a more complete combustion. The invention can be used with any of the liquids and gasses that are to be mixed but finds its major use with fuel and air in furnaces, boilers, and internal and external combustion engines.

DESCRIPTION OF THE PREFERRED EMBODIMENTS

Figure 1:
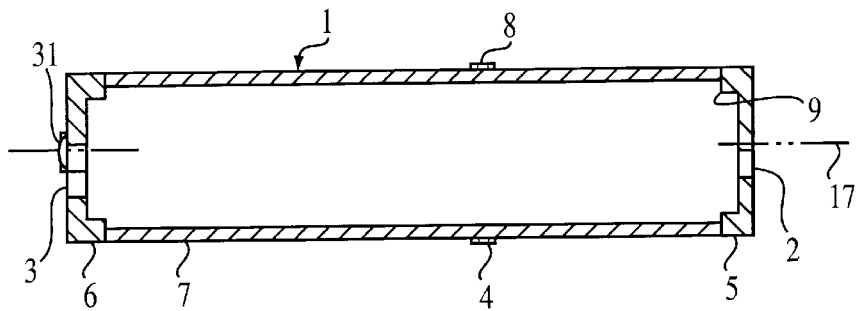
FIG. 1 is a cross-sectional top view of an enclosure of the invention

FIG. 1 shows an enclosure 1 consisting of an elongated enclosure member 7, shown in the shape of a cylinder, having a first end cap 5 and a second end cap 6. The first end cap 5 is provided with a liquid inlet port 2 and the second end cap 6 is provided with a liquid exit port 3. The elongated member is provided with openings or valves 4,8 that control the inlet and/or outlet of gas. The end caps form flanges 9 for positioning a magnetic device within the enclosure. The center line 17 passes through the center of the enclosure 1.

Figure 2:
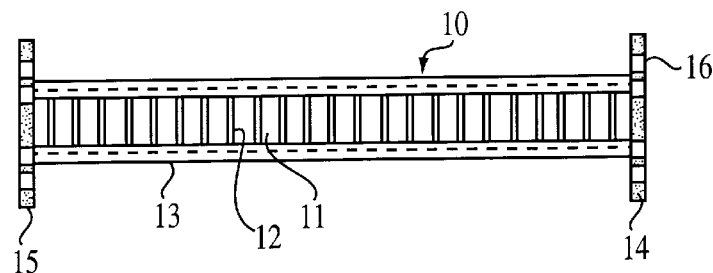
FIG. 2 is a side view of a magnetic field generator of the invention.

FIG. 2 shows an elongated magnetic field generator 10. The magnetic field generator has permanent magnets 11 spaced apart with non-magnetic spacers 12. The magnets and spacers are positioned and held in an elongated linear configuration by fulcrums or rods 13 that extend between a first reinforcement plate 14 and a second reinforcement plate 15. The reinforcement plates are perforated 16 so that fluids can travel through them. The magnetic field generator 10 is positioned within the enclosure 1 by placing the reinforcement plates 14,15 against the flanges 9 of the enclosure end caps 5,6.

Figure 3:
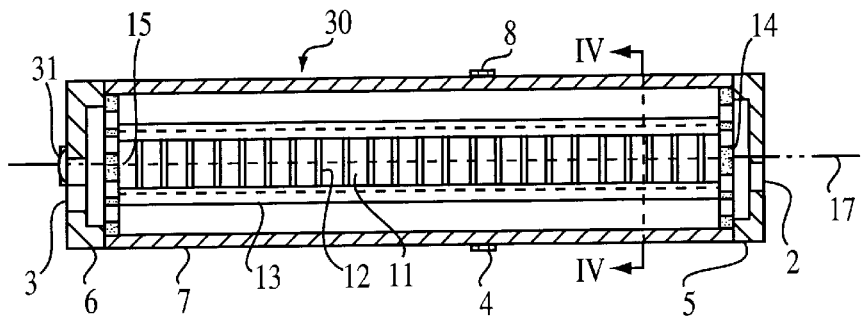
FIG. 3 is a cross-sectional top view of the enclosure with the magnetic field generator positioned within the enclosure.

FIG. 3 is a sectional side view of the magnetic device 30 including the enclosure 1 with the elongated magnetic field generator 10 positioned in it. While the enclosure and magnetic field generator can be constructed as one permanent unit, it is preferred that there be access to the enclosure interior. It is preferred that access to it be by removal of one or both end caps 5,6. One or both of the end caps can, for example, be threaded or bolted to the elongated enclosure member 7. A centrally located liquid surface meter 31 is shown on the second end cap to provided for indicating and controlling the liquid level within the enclosure.

Figure 4:
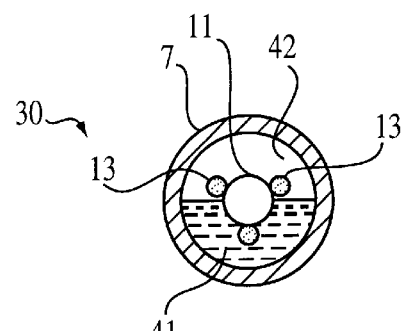
FIG. 4 is a cross-sectional end view along the section line IV—IV on FIG. 3. the enclosure having the magnetic field generator positioned in it with gas and liquid shown within the enclosure.

FIG. 4 is an end view of the magnetic device 30 of FIG. 3 as shown by the section line IV—IV with a liquid 41 occupying the lower half of the magnetic device and gas 42 occupying the upper half. As can be seen, the magnets 11 extend up into the gas and downwardly into the liquid. It is preferred that the liquid surface meter 31 and valves 4,8 be used to maintain the liquid level so that the magnets extend half way into the gas 42 and half way into the liquid 41.

It has been found that an improvement in the influence of a magnetic device on a liquid can be achieved by having the magnets and magnetic field extend between a gas and the liquid. It is desirable that the interface area between the gas and liquid be reasonably large. By having the magnets of a magnetic field generator extend both into the liquid and into a gas and have the magnetic fields created by the magnets extend through the liquid and through the gas, the liquid is influenced by both. The result is that the affinity of the gas and liquid for each other is improved when the liquid is dispersed into a gas. The gas used in the magnetic device can be the same gas that is subsequently mixed with the liquid or it can be a different gas. For example, the gas 42 in the enclosure 7 can be essentially a permanent part of the magnetic device 30 or the gas 42 can be passed into the enclosure 7 through an opening or valve 8 and exited through an opening or valve 4 to be mixed or dispersed with the liquid 41. Alternately, the liquid 41 can be mixed with one or more other liquids and the gas 42 can be mixed with one or more other gasses. If the gasses used are not the same, the gasses should be checked to determine the combination of gasses that will produce the best results with the specific liquid treated. The interaction between the gas used in the enclosure and gas ultimately mixed with the liquid could produce varying degrees of efficiency in mixing. The combination of gasses that give the best results for a particular liquid should be used. As an example, if fuel and air are to be mixed, the gas used in the enclosure could be air or one of its components, or it could be an inert gas or a mixture including an inert gas.

The magnets used in the magnetic field generator 10 can take on any of the common forms in use. The shape and composition of the magnets is optional and can be chosen depending on the enclosure shape and gas and liquid used. It is preferred that the magnets 11 be in the form of discs or cylinders with one face being a north pole and the other face being a south pole. The spacers 12 can be any non-magnetic material and, although not necessary, are shown having the same diameter and shape as the magnets 11. The magnets may be alined to accommodate different needs and different liquids. For some liquids it is preferred that the magnets be alined so that all of the north poles are alined facing the same direction with the south poles inherently all being alined facing in the opposite direction. It is also popular to have adjacent north poles face each other while adjacent south poles face each other. The direction the magnetic poles face will be along the flow path of the liquid in the enclosure. It is preferred that the magnets 11 be alined and centered along the centerline 17 of the cylindrical enclosure 1. With the liquid level maintained at about the centerline of the enclosure, the liquid is under the uniform influence of both the magnetic fields in the liquid and the magnetic fields in the gas.

The enclosure shape is not important. The cylinder or elongated enclosure member 7, the end caps, 5,6, the spacers 12, the reinforcement plates 14,15, and the rods 13 can all be made of a non-magnetic material such as aluminum. With the poles of the magnet all facing in the same direction, a magnetic field will exist between each face of each magnet and the face of the next adjacent magnet. As an example of the dimensions and numbers that can be used, 24 disc magnets can be placed in alinement with 23 discs between them. The magnets can each have a 22 millimeter diameter and a 10 millimeter thickness. The discs can have a 20 millimeter diameter with a 2 millimeter thickness.

The liquid 41 that passes through the magnetic device and is treated by the magnetic fields has an increased affinity toward gas. The affinity extends to gasses that did not pass through the magnetic field. This change in affinity is due to the influence the magnetic field generator 10 has on the liquid due to the uniform magnetic field exerted within the enclosures on both the gas and the liquid in surface contact with each other. For example, the molecular movement is increased. The physical changes are believed to include an alinement of the molecules and reduction in the ability of the molecules to cling together, resulting in an easier separation of the molecules before or when mixed with a gas, and/or to include a polarization or bipolar orientation of the liquid and gas, so that there is directly or indirectly an attraction of the gas and liquid molecules for each other. In any event, the result is that the two have an affinity for each other and an increased dispersal of the liquid in the gas. The gas can be one element or a mixture of elements or molecules. The device will work on a mixture of gasses even if one or more of the gasses is inert or of limited ability to interact with other substances.

The metering or indicating means 31 is used primarily to show the level of liquid within the enclosure. While the indicating means could be associated with a liquid level control, since under all operating conditions the liquid is passed through the enclosure, it is preferred that the control of the liquid level in the enclosure be through one or both of the openings or valves 4,8 in the enclosure cylinder 7 wall. By adding gas 42 and/or increasing gas pressure within the enclosure 1 or by removing gas and/or decreasing gas pressure within the enclosure, the level of the liquid can be controlled.

While the primary concern is to treat the liquid before it is mixed with any desired gas, the liquid can be mixed with the same gas present in the enclosure. The gas within the enclosure can be transient, entering at an inlet 8 and exiting at an outlet 4. Since the gas is also inherently treated by the magnetic field present in the enclosure, the gas 42 can be mixed with the liquid 41 or some other liquid before or after it is mixed with one or more other gasses.

EXAMPLE

As a test of the device, a YANMAR SK, 6 HP/1700 r.p.m., 665 cc, IDI diesel engine was used with a load dynamometer connected to it. Measurements were made of the fuel consumed for a given period of time. The tests were conducted in four stages of load: 25%, 50%, 75% and 100% of full load capacity. Each stage test was ran twice, once with the present magnetic device used and once with the magnetic device not used. Each test was conducted using 10 cc of fuel with the time required to consume the fuel recorded. At 100% of load it took 31.4 seconds to consume the 10 cc of fuel using the device of this invention. At 100% of load it took 24.5 seconds to consume 10 cc of fuel when the device of this invention was not used. This represented a fuel savings of 22%. Measurements at lesser percentages of full power were about the same as those conducted at full power.

It is believed that the construction, operation and advantages of this invention will be apparent to those skilled in the art. It is to be understood that the present disclosure is illustrative only and that changes, variations, substitutions, modifications and equivalents will be readily apparent to one skilled in the art and that such may be made without departing from the spirit of the invention as defined by the following claims.

We claim:

1. A device for treatment of fluids in a magnetic field comprising:

an enclosure having first and second ends, sides, an upper extent and a lower extent;

magnets positioned within said enclosure between said ends and said sides and said upper extent and said lower extent;

a liquid inlet and a liquid outlet for conducting liquid through said enclosure;

means for admitting a gas into and exiting a gas from said enclosure;

means for controlling the level of liquid within said enclosure;

said means for controlling said level of liquid within said enclosure being capable of maintaining said level of said liquid so that a portion of said magnets is within said liquid and a portion of said magnets is within said gas.

2. A device for treatment of fluids in a magnetic field as in claim 1 wherein:

said magnets are arranged side by side and shaped into an elongated configuration with a nonmagnetic spacer interposed between each magnet.

3. A device for treatment of fluids in a magnetic field as in claim 2 wherein:

said magnets are each in the shape of a disc with one face of the disc being the north pole and the other face of the disc being the south pole.

4. A device for treatment of fluids in a magnetic field as in claim 3 wherein:

said magnets are arranged side-by-side such that all of the magnets have their north poles facing in the same direction.

5. A device for treatment of fluids in a magnetic field as in claim 3 wherein:

said magnets are arranged side by side such that each internal magnet has its north pole facing the north pole of an adjacent magnet and its south pole facing the south pole of an adjacent magnet.

6. A device for treatment of fluids in a magnetic field as in claim 3 wherein:

said magnets and non-magnetic spacers are constrained in said side by side arrangement by rods that extend along the length of said magnets and non-magnetic spacers.

7. A device for treatment of fluids in a magnetic field as in claim 6 wherein:

said rods are attached at their ends to plates that both restrain said magnets and non-magnetic spacers in said elongated configuration and locate and position said magnets and non-magnetic spacers within said enclosure.

8. A device for treatment of fluids in a magnetic field as in claim 7 wherein:

said rods, said plates, said enclosure, as well as said non-magnetic spacers, are all made of a non-magnetic material.

9. A device for treatment of fluids in a magnetic field as in claim 1 wherein:

said means for controlling said liquid level within said enclosure is capable of essentially maintaining equal portions of said magnets within said liquid and within said gas.

10. A device for treatment of fluids in a magnetic field as in claim 1 wherein:

said enclosure outer surfaces is in the shape of a cylinder.

11. A device for treatment of fluids in a magnetic field as in claim 10 wherein:

said magnets are alined adjacent one another and are shaped into an elongated configuration.

12. A device for treatment of fluids in a magnetic field as in claim 11 wherein:

said elongated configuration of magnets are positioned concentrically along said cylinder-shaped enclosure centerline.

13. A device for treatment of fluids in a magnetic field as in claim 10 wherein:

said magnets are arranged side by side and shaped into an elongated configuration with a nonmagnetic spacer interposed between each magnet;

said magnets are each in the shape of a disc with one face of the disc being the north pole and the other face of the disc being the south pole;

said means for controlling said liquid level within said enclosure is capable of essentially maintaining equal portions of said magnets within said liquid and within said gas.

14. A device for treatment of fluids in a magnetic field as in claim 1 wherein:

said liquid inlet is in said enclosure first end and said liquid outlet is in said enclosure second end;

said magnets are each separated by a non-magnetic spacer;

said magnets and said non-magnetic spacers are constrained in a side by side arrangement by rods that extend along the length of said magnets and non-magnetic spacers;

said means for controlling said liquid level within said enclosure is capable of essentially maintaining equal portions of said magnets within said liquid and within said gas.

15. A device for treatment of fluids in a magnetic field as in claim 14 wherein:

said rods are attached at their ends to plates that both restrain said magnets and non-magnetic spacers in said elongated configuration and locate and position said magnets and non-magnetic spacers within said enclosure;

said plates are provided with openings for passage of said liquid.

16. A process for assisting the mixing of a gas and a liquid including the steps of:

providing an enclosure;

providing an elongated magnetic path using magnets alined in an elongated horizontal configuration within said enclosure;

providing a gas inlet and outlet to said enclosure;

providing a liquid inlet into and a liquid outlet from said enclosure;

maintaining a gas within said enclosure, maintaining a liquid level within said enclosure such that a portion of said elongated alined magnets extend into said liquid and a portion of said elongated alined magnets extends into said gas;

conducting said liquid past said elongated alined magnets through their magnetic fields.

17. A process for assisting the mixing of a gas and a liquid as in claim 16 including the steps of:

conducting said liquid from said liquid outlet and mixing it with a gas.

18. A process for assisting the mixing of a gas and a liquid as in claim 16 including the steps of:

passing said gas through said enclosure, conducting said gas from said enclosure and mixing it with said liquid.

19. A process for assisting the mixing of gas and a liquid as in claim 17 including the steps of:

prior to said mixing of said liquid with a said gas, mixing said liquid with a second liquid.

20. A process for assisting the mixing of a gas and a liquid as in claim 16 including the steps of:

passing said gas through said enclosure;

mixing said gas with a second gas;

mixing said gas and said second gas with a liquid.

* * * * *